Figure 1:
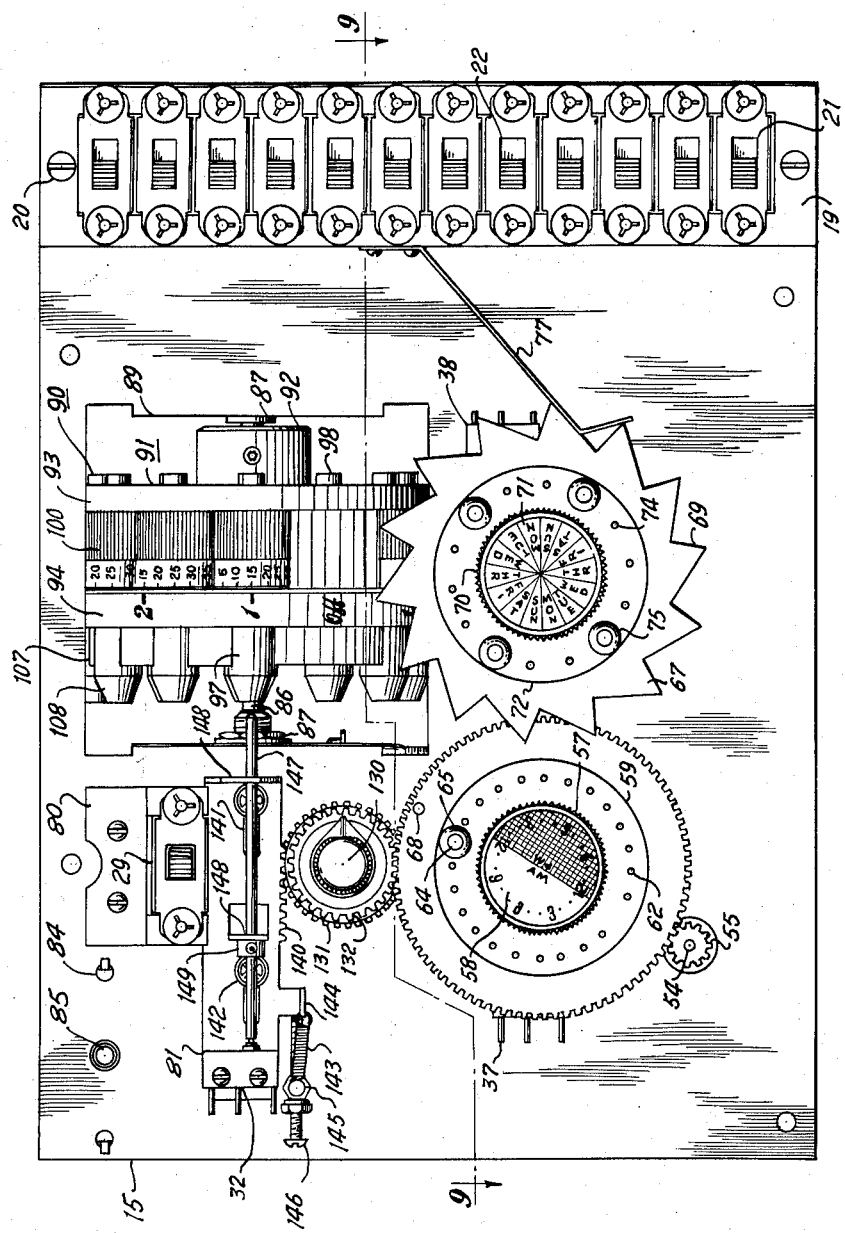

March 3, 1964    L. A. MARTINI    3,123,681
AUTOMATIC VARIABLE TIME CONTROLS
Filed Nov. 15, 1961    6 Sheets-Sheet 1

INVENTOR
Leo A. Martini
BY *Ehley & Ehley*
ATTORNEYS

INVENTOR
Leo A. Martini

BY Ashley & Ashley
ATTORNEYS

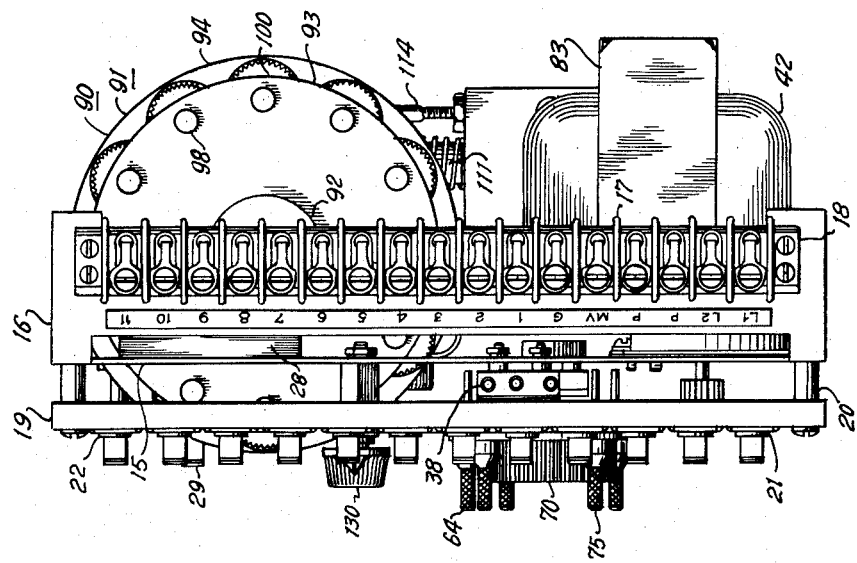
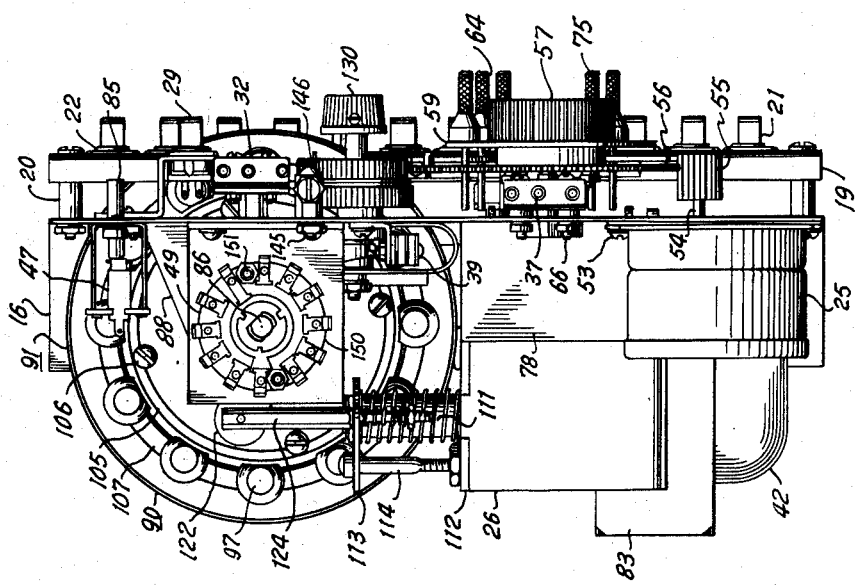

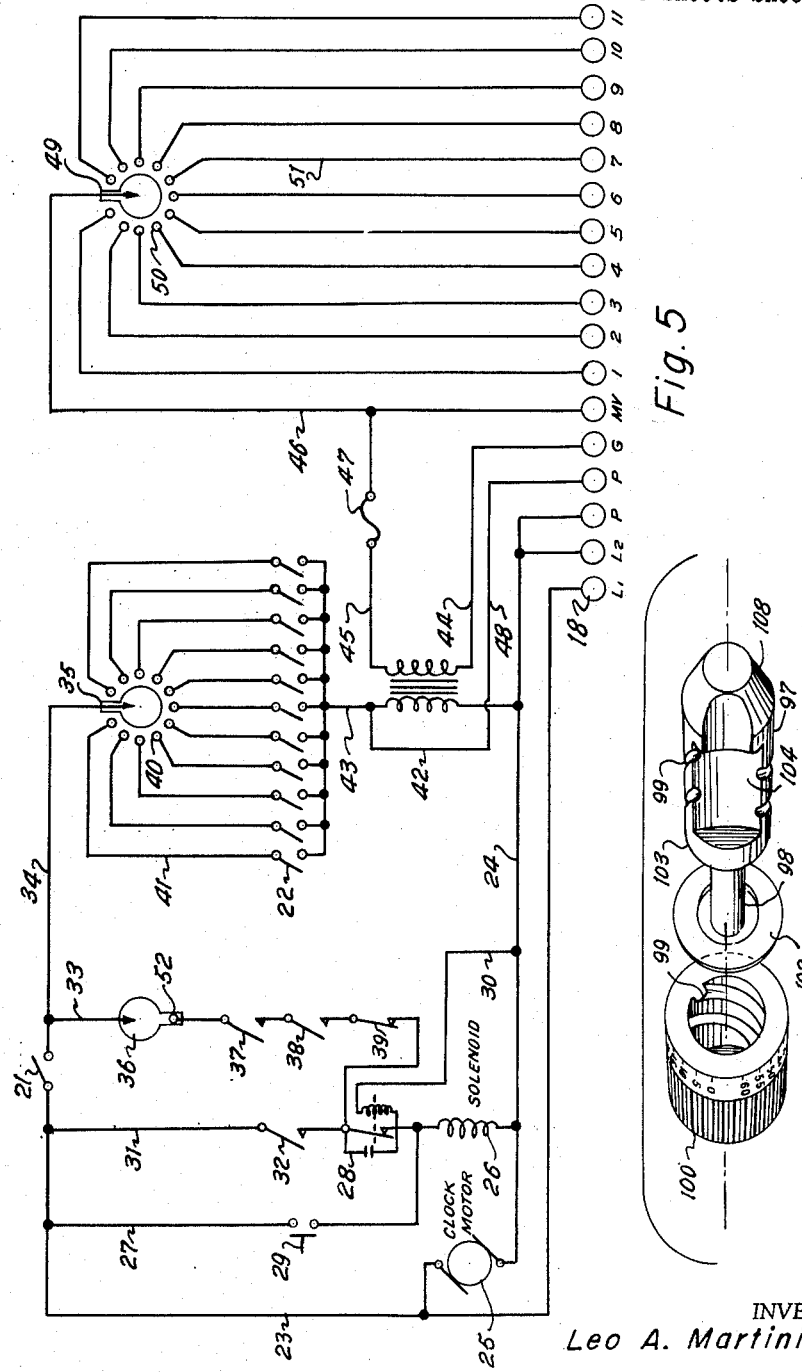

INVENTOR
Leo A. Martini
BY Shley & Shley
ATTORNEYS

March 3, 1964
L. A. MARTINI
3,123,681
AUTOMATIC VARIABLE TIME CONTROLS
Filed Nov. 15, 1961
6 Sheets-Sheet 6
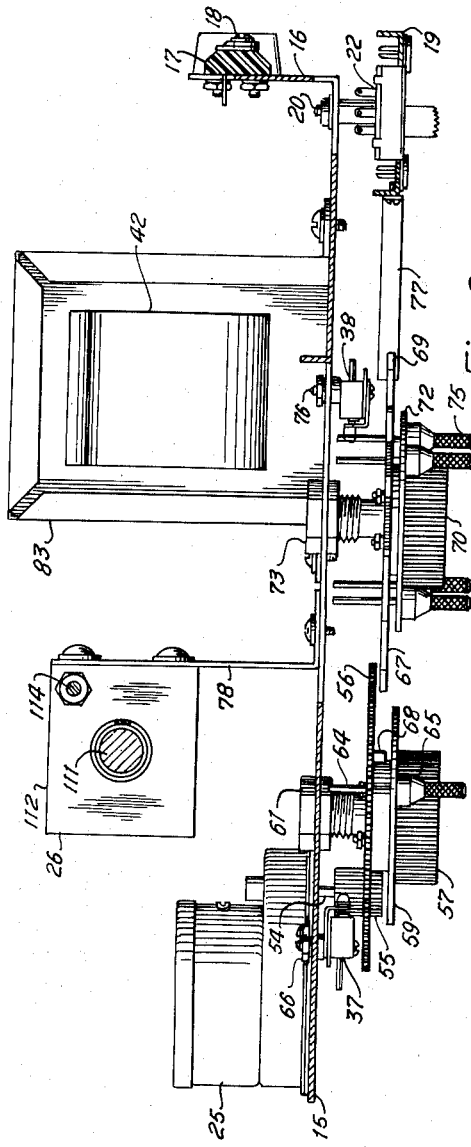
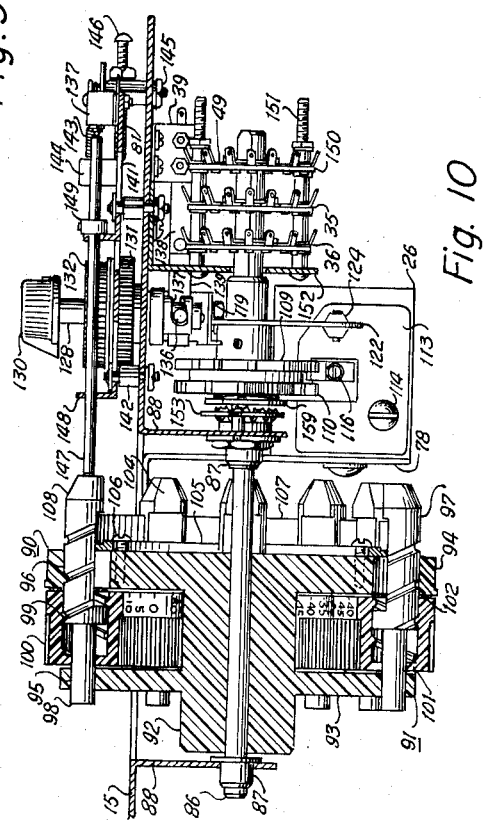
INVENTOR
Leo A. Martini
BY Ashley & Ashley
ATTORNEYS

United States Patent Office 3,123,681
Patented Mar. 3, 1964

3,123,681
AUTOMATIC VARIABLE TIME CONTROLS
Leo A. Martini, Dallas, Tex., assignor to Telsco Industries, Dallas, Tex., a corporation of Texas
Filed Nov. 15, 1961, Ser. No. 152,683
22 Claims. (Cl. 200—33)

This invention relates to new and useful improvements in automatic, variable time controls.

One object of the invention is to provide an improved control for timing the operation of a lawn sprinkler system or other systems having a plurality of valves or other mechanisms by selective and individual actuation of the valves or mechanisms either fully automatically, semi-automatically or manually.

Another object of the invention is to provide an automatic time control for sequentially actuating a plurality of mechanisms at predetermined intervals for variable periods of operation wherein the operating period of each mechanism may be varied independently of the operating periods of the other mechanisms.

A further object of the invention is to provide an improved automatic time control, of the character described, which is capable of manual operation to permit actuation of any one of the mechanisms whenever desired as well as omit actuation of one or more selected mechanisms.

A particular object of the invention is to provide an improved automatic time control, of the character described, having novel means for initiating operation of the mechanisms at predetermined intervals of time, for actuating said mechanisms in sequence throughout a cycle and for individually regulating the operating period of each mechanism whereby the duration of operation may vary from mechanism to mechanism.

An important object of the invention is to provide an improved automatic time control, of the character described, having rotary means for controlling the supply of electrical current to a plurality of electrically-operated mechanisms and means for imparting rotation to the rotary means so as to actuate the mechanisms successively, together with switch means coacting with said rotary means for operating the motion imparting means at predetermined intervals of time throughout a cycle.

Another object of the invention is to provide an improved automatic time control, of the character described, wherein the rotary means has adjustable elements for regulating the operation of the mechanisms and for actuating the switch means, the adjustment of the elements determining the operating periods of said mechanisms and the time intervals of actuation of said switch means.

A construction designed to carry out the invention will be hereinafter described, together with other features of the invention.

Figure 2:
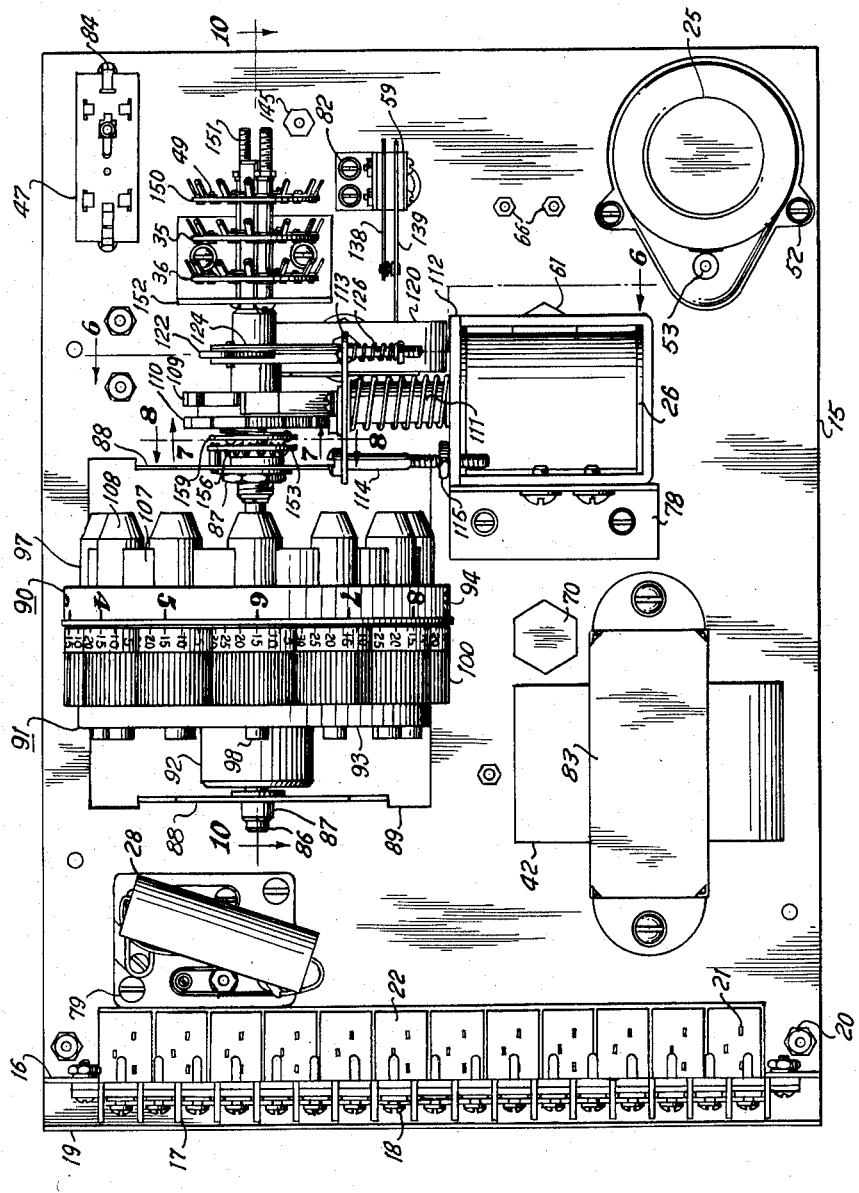
Figures 6, 7, 8:
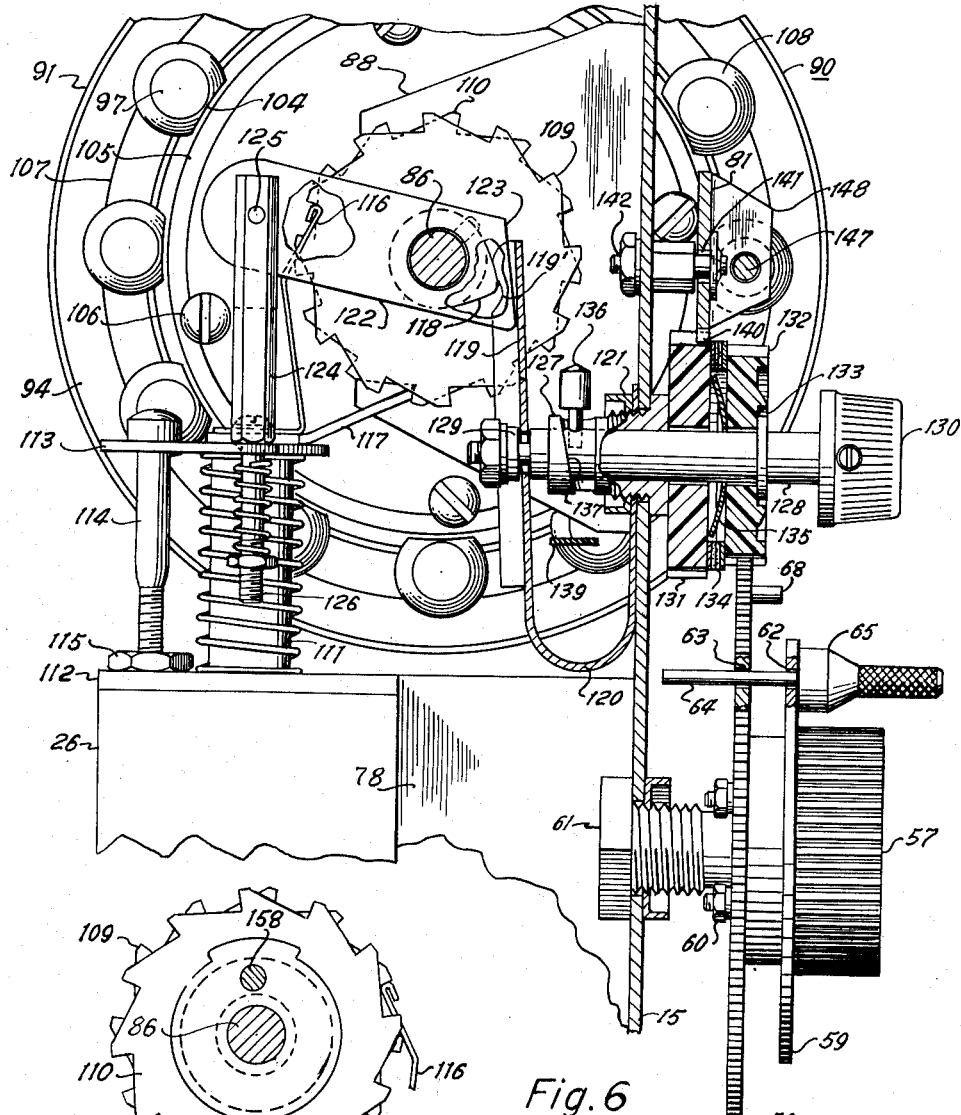

The invention will be more readily understood from a reading of the following specification and by reference to the accompanying drawings, wherein an example of the invention is shown, and wherein:

FIG. 1 is a front, elevational view of an automatic, variable time control constructed in accordance with the invention, FIG. 2 is a rear, elevational view of the control, FIG. 3 is an end, elevational view of the control, FIG. 4 is an opposite end, elevational view, FIG. 5 is a schematic view of the wiring diagram, FIG. 6 is an enlarged, transverse, vertical, sectional view, taken on the line 6—6 of FIG. 2, FIG. 7 is a view, similar to FIG. 6, taken on the line 7—7 of FIG. 2, FIG. 8 is a view, similar to FIG. 6, taken on the line 8—8 of FIG. 2, FIG. 9 is a horizontal, cross-sectional view, taken on the line 9—9 of FIG. 1, FIG. 10 is a view, similar to FIG. 9, taken substantially on the line 10—10 of FIG. 2, and FIG. 11 is a perspective view of one of the plungers of the magazine assembly and its adjusting knob.

In the drawings, the numeral 15 designates the chassis of an automatic, variable time control which may be in the form of an upright, rectangular plate having a coextensive, lateral flange 16 projecting rearwardly from one of its ends for supporting an elongate, upright terminal block 17. The control is particularly adapted for timing the operation of a sprinkler system (not shown) of the type having an electrically-operated main control or master valve, a plurality of electrically-operated secondary or station valves for controlling the flow of water to independent groups or series of sprinklers and, if desirable or necessary, a pump. As shown most clearly in FIGS. 2 and 4, the block 17 carries a plurality of electrical terminals 18 for connection with a source of electrical current at L1 and L2, a pump starter or other circuit at P and P, a main control mechanism or valve at MV, a ground or neutral at G, and secondary or station control mechanisms or valves at 1 through 11. It is noted that the number of secondary or station control valves is subject to variation and that the number of terminals 18 may be increased or decreased accordingly or all of said terminals need not be used. Also, it is contemplated that the terminals may be connected to other mechanisms for controlling the actuation thereof at predetermined intervals for variable periods of time. An elongate, upright bracket 19 is suitably fastened, as shown at 20, in overlying, forwardly-spaced relation to the end of the chassis 15 adjacent the terminal block and has a master switch 21 for the terminal L1 and a plurality of similar manual control switches 22 for the terminals 1-11 mounted thereon (FIGS. 1, 2, 4 and 9).

The terminal L1 is connected to the master switch 21 by a lead 23 from which a lead 24 extends to the terminal L2 (FIG. 5) and a clock motor 25 is connected in the lead 24 for continuous operation when said terminals are connected to an electrical current source. A solenoid 26 is connected to the lead 24 between the terminal L1 and clock motor 25 and by a lead 27, through a time delay relay 28, to the lead 23 between its connection to said lead 24 and the master switch, the lead 27 having a manual indexing switch 29 connected therein to permit energizing of the solenoid independently of said master switch. The time delay relay 28 is connected by a lead 30 to the lead 24 and by a lead 31, having a normally-open switch 32 therein, to the lead 23. Another lead 33 extends from the relay 28 to a lead 34 which connects the master switch 21 to a multiple contact switch 35 of the rotary selector type. The lead 33 has a single contact rotary switch 36, similar to the switch 35, normally-open switches 37 and 38 and a manually-actuated switch 39 connected therein. Each manual control switch 22 is connected to an individual contact 40 of the multiple contact switch 35 by a separate lead 41 and to a transformer 42 by a common lead 43. In addition to the lead 24, the transformer 42 is connected to the terminal G by a lead 44 and to the terminal MV by leads 45 and 46. Preferably, a fuse or circuit breaker 47 is connected in the lead 45 between the transformer and lead 46. One of the terminals P may be connected to the lead 24 and the other terminal P to lead 43 by a lead 48. A multiple contact, rotary selector switch 49 is connected to the lead 46 for receiving current of reduced voltage from the transformer and has a plurality of contacts 50, one for each of the terminals 1-11 and connected thereto by a separate lead 51.

As will be explained, the selector switches 35, 36 and 49 are mounted for rotating in unison and are rotated initially by energization of the solenoid 26 upon closing of the switches 37 and 38 by means of the clock motor 25 when said switch 36 is engaged with its single contact 52 and the master control and manually-actuated switches 21 and 39 are closed. It is noted that the contacts 40 and 50 of the switches 35 and 49 are positioned so as to be disengaged upon engagement of the switch 36 with its contact. The switch 39 is closed to permit automatic operation since opening of said switch prevents energizing of the solenoid through the switches 21, 36, 37 and 38. After initial energization, the solenoid is actuated intermittently through the switch 32 to sequentially engage the switches 35 and 49 with their respective contacts 40 and 50 for supplying electrical current to the terminals 1–11 through their switches 22 until the selector switches revolve to their original position (FIG. 5). Although the switches 37 and 38 may remain closed, no current is supplied to the solenoid 26 through the lead 33 due to rotation of the switch 36 out of engagement with its single contact. Also, the time delay relay 28 breaks the circuit and prevents continued energization of the solenoid. If a switch 22 is open, no current is supplied to its terminal; however, as will be explained, the solenoid is actuated to rotate the switches 35, 36 and 49 by closing of the switch 32 after an interval of time. When the switch 36 again engages its single contact 52, the cycle is repeated upon closing of the switches 37 and 38.

As shown by the numeral 53 in FIGS. 2, 3 and 9, the clock motor 25 is attached to the rear surface of the chassis 15 and has its drive shaft 54 projecting forwardly through said chassis for supporting a pinion 55 in meshing engagement with a gear 56 of much larger diameter. The gear ratio between the pinion 55 and gear 56 is such that said gear makes one complete counter clockwise revolution every twenty-four hours or other period of time. A knob 57, having a twenty-four hour dial or face 58 and an external, radial flange 59, overlies and is secured to the gear by screws and nuts 60 and said gear is journaled on the front end of a shaft 61, which may be in the form of a bolt, fixed to and projecting forwardly from the chassis (FIGS. 1, 6 and 9). The flange 59 has a plurality of axially-extending openings 62, one for each hour or other time interval of the dial 58 except 12:00 p.m., and the gear 56 has openings 63 registering with the openings 62 for receiving one or more of the pins 64 which extend rearwardly of said gear. An enlarged head 65 is formed on the outer portion of each pin 64 and, preferably, is magnetized so as to cling to the flange 59 and prevent accidental displacement of the pin. As shown by the numeral 66 in FIGS. 2, 3 and 9, the switch 37 is fastened to the front surface of the chassis behind the gear for engagement and actuation by each pin 64. For imparting clockwise rotation to a toothed wheel or sprocket 67, one or more pins 68 project forwardly from the gear 56 adjacent its peripheral teeth.

The sprocket 67 has fourteen or other number of ratchet teeth 69, one for each day or other time interval of a two week period or other time period, which are adapted to overlie a peripheral portion of the gear and be engaged in sequence by the pin 68 (FIGS. 1, 4 and 9). A knob 70, similar to the knob 57 and having a fourteen day dial or face 71 and an external, radial flange 72, is carried by the sprocket which is journalled on a shaft or bolt 73 in the same manner as the gear. The flange 72 and sprocket 67 have axially-extending, registering openings 74, corresponding in number to the sprocket teeth 69 and having a fixed relation thereto, for receiving pins 75 which are identical to the pins 64 and which are adapted to engage and actuate the switch 38. Although four pins 75 are shown, any number may be employed. Suitable fasteners 76 attach the switch to the front surface of the chassis behind the sprocket. Positive positioning of the sprocket 67 is achieved by a resilient detent 77 secured to the bracket 19 and engaging one of the teeth of said sprocket. It is noted that a complete revolution of the gear 56 is required to turn the sprocket 1/14 of a revolution whereby said sprocket makes only one complete revolution upon fourteen revolutions of said gear. Since each revolution of the gear requires twenty-four hours, fourteen days is required for each revolution of the sprocket.

The solenoid 26 is mounted on the rear surface of the chassis 15 adjacent the clock motor 25 by an angular bracket 78 (FIGS. 2, 3, 6 and 9), the time delay relay 38 is secured to said chassis rear surface adjacent the switches 22 as shown at 79 in FIG. 2; the manual indexing switch 29 is fastened to the front surface of said chassis above the gear 56 by a bracket 80 (FIG. 1); the switch 32 is slidably mounted on said chassis front surface adjacent said switch 29 by a shuttle plate or rack member 81 (FIGS. 1 and 10); the manually-actuated switch 39 is fastened to said rear surface adjacent said solenoid as shown at 82 in FIG. 2; the transformer 42 is mounted on said rear surface adjacent said solenoid by a U-shaped bracket 83; the circuit breaker 47 is fastened to said rear surface above said switch 39 as shown at 84 and has a plunger 85 projecting through said chassis to permit manualy resetting thereof. A horizontal shaft 86 extends longitudinally of the chassis above the solenoid and switch 39 for supporting the rotatable armatures of the selector switches 35, 36 and 49 and is journaled by suitable bearings 87 in brackets 88 struck and bent rearwardly from said chassis in spaced relation to said switches. Between the brackets 87, a large, rectangular opening or window 89 is provided in the chassis for accommodating and forwardly exposing a portion of a station index or magazine assembly 90.

As shown most clearly in FIG. 10, the assembly 90 includes a cylindrical magazine or turret 91 having an axial hub 92 fixed to one end of the shaft 86 and a pair of external, parallel, radial flanges 93 and 94. A plurality of circular openings 95, one for each of the eleven contacts 40 and 50 of the selector switches 35 and 49, extend axially of the peripheral portion of the flange 93 in axial alinement with openings 96, of larger diameter, in the peripheral portion of the flange 94 which bears identifying numerals "1–" through "11–." The openings are equally spaced except between two of the openings marked "1–" and "11–" on the periphery of the flange 94 and corresponding to the first and last contacts of the selector switches, which contacts are connected to the terminals 1 and 11 and the switches 22 thereof, the adjacent portion of said flange periphery bearing the notation "Off." A complementary element or plunger 97 is slidably mounted in each opening 96 and has a reduced end portion or pin 98 slidable in the registering opening 95 so as to be movable axially of the magazine 91. Each plunger 97 is rotatably connected by coarse screwthreads 99 to a concentric, cylindrical knob or tubular barrel 100 which may be knurled and which is confined upon the plunger between the flanges 93 and 94 whereby said plunger is reciprocated by rotation of the barrel (FIG. 11). An internal, radial flange 101 is provided on the end of the barrel 100 adjacent the flange 93 for engaging the reduced pin 98 of the plunger. For resisting rotation of the barrel, a spring washer 102 is confined on the plunger between the opposite end of said barrel and the flange 94 and urges said barrel toward the flange 93.

Each barrel 100 has graduations and indicia, such as "–5" through "–60," for indicating the projection of its coacting plunger 97 which determines the interval of time that the magazine assembly 90 as well as the rotary switches will remain in one position. The duration of time is greatest when the plunger is retracted and its pin 98 projected and least when said pin is retracted and said plunger completely projected. Although each opening 96 and the inner extremity 103 of each plunger are circular and complementary to the bore of each barrel, the major portion of each plunger has an inwardly-facing, flattened surface 104 to prevent rotation thereof with the barrel. An annular retainer or stop ring 105 overlies portions of the outer ends of the openings 96 for coacting with the flattened surfaces 104 as well as the circular inner extremities 103 of the plungers to limit the projection of said plungers and is secured to the flange 94 by screws 106. Preferably, spacers 107 extend axially from the flange 94 between the plungers 97 to assist in supporting the same and the outer extremities 108 of said plungers may be bevelled or chamfered.

Sprockets or toothed wheels 109 and 110, having oppositely-directed teeth, are mounted on the shaft 86 above the solenoid 26 for imparting rotation to said shaft and for preventing reverse rotation thereof upon actuation of said solenoid (FIGS. 2, 6 and 7). The spring-pressed armature 111 of the solenoid projects upwardly through a horizontal plate 112, overlying said armature and secured to the bracket 78, and has a horizontal bar or plate 113 attached to its upper end for movement therewith. Upward travel of the armature 111 and its plate 113 are limited by the head of an upright stop screw 114 which depends through said plate and has its lower end screw-threaded through the plate 112, being held in adjusted positions by a lock nut 115. An angular, resilient arm or pawl 116 is attached to the plate 113 for engaging the teeth of the sprocket 109 to rotate the shaft clockwise upon upward reciprocation of the armature, and said plate carries a similar arm or detent 117 for engaging the teeth of the sprocket 110 to stop rotation of said shaft (FIGS. 6 and 7).

The sprocket 109 has a cam 118 projecting radially from its hub for engaging and urging forwardly the free arm 119 of an upright, U-shaped spring or resilient member 120, which has the upper end portion of its other arm fastened to the rear surface of the chassis 15 as shown at 121 in FIG. 6, when the shaft 86 is rotated to dispose the selector switches 35, 36 and 49 in the position shown in FIG. 5. An arm or lever 122, having a downwardly and forwardly inclined, front end or cam surface 123 for engaging and urging the spring arm 119 forwardly, is pivoted loosely the shaft adjacent the cam 118 and has its rear end pivotally attached to the bifurcated, upper end of an upright link or rod 124 as shown at 125. The lower end of the link extends through the plate 113 and has a helical spring 126 confined thereon for urging said link downwardly. Due to the loose mounting of the lever 122 and link 124, the spring arm is flexed forwardly only when said lever is pivoted counterclockwise upon downward reciprocation of the link with the armature 111 of the solenoid 26. As shown by the numeral 119', the spring arm is flanged rearwardly and has a recess therein below its upper end to accommodate the cam 118 and permit rearward flexing of said spring arm.

A flanged bushing or collar 127 extends rearwardly through the chassis 15 and the fastener 121 of the U-shaped spring 120 for rotatably and slidably supporting a horizontal shaft 128 which has its rear end rotatably connected to the intermediate portion of the free arm 119 of said spring, as shown at 129 in FIG. 6, below the cam surface 123 of the lever 122. The shaft 128 is urged rearwardly by the force of the spring and is adapted to be turned by a knob 130 on its front end. A pair of relatively-small gears 131 and 132 are journaled on the shaft between the chassis and knob 130 and are loosely confined against outward displacement by a radial flange 133 on said shaft overlying the outer gear 132 which meshes with and is driven by the gear 56. The gears 131 and 132 have contiguous, annular clutch faces 134 which are urged apart by a resilient disk 135 confined between said gears on the shaft 128 and which are held in engagement by the greater force of the spring 120 whereby said gear 131 rotates with said gear 132. A headed pin 136 projects radially from the rear portion of the shaft through a helical cam slot 137 cut in the rear portion of the collar 127 so as to move said shaft forwardly and disengage the clutch faces 134 upon counter-clockwise rotation of the knob 130. The switch 39 has a pair of adjacent horizontal contact arms 138 and 139 extending laterally therefrom, with the lower arm 139 being resilient and of much greater length than the arm 138 so as to underlie the shaft 128 and its headed pin 136 (FIGS. 2 and 6). Upon counterclockwise rotation of the shaft, its pin engages and depresses the arm 139 out of engagement with the arm 138 so as to open the switch 39 and prevent automatic operation of the control.

As shown in FIGS. 1, 6 and 10, the shuttle plate 81 is elongated horizontally and longitudinally of the chassis 15 so as to overlie the gear 131 and has gear teeth 140 on its lower margin meshing with the teeth of said gear. A pair of longitudinal slots 141 are formed in the shuttle plate for receiving suitable fasteners 142 to slidably connect said plate to the chassis 15 for longitudinal reciprocation toward and away from the magazine assembly 90. The plate 81 is urged away from the magazine assembly by a helical spring 143 which is connected to an angular arm 144 depending from said plate and to a post 145 secured to the chassis. An adjustment screw 146 may be carried by the post 145 for engaging the arm 144 to limit movement of the shuttle plate away from the magazine assembly. For momentarily closing the switch 32, which is carried by the shuttle plate, an elongate element or rod 147 extends longitudinally of said plate for engagement with the plungers 97 of the magazine assembly 90 and is slidably supported by brackets 148 projecting forwardly from said plate. The projection of the rod 147 from the plate 81 toward the assembly may be adjusted by a stop collar 149 on said rod adjacent one of the brackets 148.

When the clutch faces 134 are disengaged, the gear 131 is free to remain stationary or turn relative to the gear 132 which is driven clockwise constantly by counterclockwise rotation of the gear 56 due to constant operation of the clock motor 25. In addition to movement by the coaction of its pin 136 with the cam slot 137 of the collar 127, the shaft 128 is moved forwardly to disengage the clutch faces by forward flexing of the spring arm 119 upon engagement of the cam 118 of the sprocket 109 with said arm above its recess 119' as well as by the force applied momentarily by the cam surface 123 of the lever 122 upon counterclockwise pivoting thereof due to downward reciprocation of the link 124 with the armature 111 of the solenoid 26. The disengagement of the clutch faces by the cam 118 engaging the spring arm permits the gear 132 to be rotated by the gear 56 relative to the gear 131 so that the shuttle plate 81 remains stationary and so that the position of said gear 56 and the dial 58 of its knob 57 may be adjusted manually, while the momentary disengagement of said clutch faces by the cam surface of the lever engaging said spring arm permits reverse or counterclockwise rotation of said gear 131 and reciprocation of said shuttle plate and its rod 147 away from the magazine assembly. With the clutch faces 134 engaged, the gear 131 rotates clockwise with the gear 132 to reciprocate the shuttle plate and its rod toward the magazine assembly until the rod engages one of the plungers of said assembly so as to close the switch 32 and actuate the solenoid.

As shown in FIGS. 2 and 10, each of the selector switches 35, 36 and 49 includes a stationary insulation disk 150 for supporting the respective contact 52, 40 and 50 thereof and each disk is suitably secured by spacers, nuts and screws 151 to an angular bracket 152 on the rear surface of the chassis 15 and having the shaft 86 extending therethrough. For accurately positioning the selector switches relative to their respective contacts, a plate 153 is journaled on the shaft between the sprocket 110 and one of the brackets 88 and is held against rotation by a pin or screw 154 extending through the bracket. As shown in FIG. 8, the plate 153 has a circular opening 155 concentric to the shaft 86 and an annular ball retainer 156 has a press fit in the opening. A plurality of equally-spaced pockets or recesses 157 are formed in the periphery of the retainer 156 for receiving a ball 158 which is carried by a disk 159 fixed on and rotatable with the shaft (FIG. 7). Manifestly, the recesses 157 and ball 158 coact to resist rotation of the shaft and rotary switches relative to the contacts of said switches.

In operation, the pins 64 and 75 are inserted through the openings 62 and 74 of the flanges 59 and 72, respectively, for the desired program of cycle or sequential control starting times. Usually, only pin 64 is employed, but two or more may be if it is desired to water more than once a day. Since the flange 72 is carried by the sprocket 67, which revolves once every fourteen days, a number of pins 75 may be employed. As has been explained, the gear 56 is driven constantly counterclockwise by the clock motor 25 through the pinion 55 and rotates the gear 132 clockwise. The selector switches 35, 36 and 49 are in the position shown in FIG. 5, said switch 36 engaging its single contact and said switches 35 and 49 being disengaged from their contacts 40 and 50. The magazine assembly 90 is disposed with its "Off" position in alinement with the rod 147 of the shuttle plate 81 and with its cam 118 engaging the upper end of the arm 119 of the spring 120 so as to flex said arm and slide the shaft 128 forwardly for disengaging the clutch faces 134. At the same time, the switches 29, 32, 37 and 38 are open and the switches 21 and 39 are closed. Upon each engagement of the pin 68 of the gear 56 with one of the teeth 69 of the sprocket, clockwise rotation is imparted to said sprocket until one of the pins 75 engages and closes the switch 38. Subsequent rotation of the gear causes closing of the switch 37 by engagement of the pin 68 therewith so as to energize the solenoid 26 and reciprocate its armature 111 and the link 124 downwardly. Due to the time delay relay 28, the energization of the solenoid is of short duration whereby its armature moves upwardly to raise the plate 113 and pawl 116 for rotating the sprocket 109 and shaft 86 clockwise (FIG. 6). The cam 118 moves into the recess 119' of the spring arm 119 to permit rearward flexing of said arm which slides the shaft 128 rearwardly to engage the clutch faces 134. Although the lever 122 is oscillated by this reciprocal movement, its cam surface 123 has no effect upon the spring arm due to the engagement of the cam with said arm. The magazine assembly turns with the shaft 86 to position its "1–" or first plunger 97 opposite the rod of the shuttle plate, the switch 36 is rotated out of engagement with its contact and the switches 35 and 49 are moved into engagement with their first contacts which are connected to the terminal 1. If the corresponding switch 22 is closed, electrical current is supplied through the transformer 42 to the terminal 1 as well as the terminal MV.

Due to the engagement of the clutch faces 134, the gear 131 rotates clockwise with the gear 132 to drive the shuttle plate 81 and its rod 147 toward the "1–" or first plunger of the magazine assembly 90. The amount of projection of the plunger 97 from the magazine 91 determines the amount of time required for the rod to engage said plunger. If the barrel 100 of the plunger is turned to "–15" as shown in FIG. 1, fifteen minutes is required for such engagement and tripping of the switch 32 by the rod. Momentary closing of the latter switch energizes the solenoid 26 to rotate the shaft 86 and turn the magazine assembly so as to dispose its "2–" or second plunger in alinement with the rod 147. Simultaneously, the selector switches 35 and 49 are disengaged from their first contacts and engaged with their second contacts which are connected to the terminal 2. Upon counterclockwise pivoting of the lever 122 by downward reciprocation of the armature 111 and link 124, the cam surface 123 of said arm engages and flexes the spring arm 119 and slides the shaft 128 forwardly to disengage the clutch faces whereby the spring 143 is permitted to reciprocate the shuttle plate 81 and its rod away from the assembly 90. Then, the spring arm flexes rearwardly to re-engage the clutch faces whereby the gear 131 again rotates with the gear 132 to move the shuttle plate and its rod toward the magazine assembly. This sequence of operation is repeated until the "Off" position of the assembly is again alined with the rod 147, upon which, the control remains inactive until the solenoid is energized by closing of the switches 37 and 38 upon continued rotation of the gear 56 and sprocket 67. Whenever desired, the magazine assembly 90 and selector switches 35, 36 and 49 may be rotated by manual closing of the switch 29 which energizes the solenoid.

Although the plungers 97 are shown set at "–15" for fifteen minute operation, each plunger is adjustable independently and may be set for a greater or lesser time without affecting the setting of the other plungers. Any one of the stations may be omitted by opening its switch 22, the corresponding plunger being projected to minimize the period of non-operation between adjacent stations. Even though a station is inoperative, the control continues to operate and the magazine assembly is rotated to the next station when the rod strikes the plunger of the inoperative station. Also, one or more stations may be omitted by closing of the switch 29 one or more times to energize the solenoid 26 and rotate the magazine assembly and selector switches whereby the operation is semi-automatic. When it is desired to operate the control manually, the shaft 128 is turned counterclockwise by its knob 130 and is moved rearwardly due to the coaction of its pin 136 with the cam slot 137 of the collar 127 so as to disengage the clutch faces 134 and prevent rotation of the gear 131 with the gear 132.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An automatic time control for successively supplying electrical current to a plurality of electrically operated mechanisms including a selector switch having a plurality of contacts for directing the supply of electrical current to the mechanisms, a magazine assembly, means supporting the magazine assembly and selector switch for rotation in unison, means for imparting intermittent rotation to the supporting means to advance the switch and assembly step by step, a plurality of elements corresponding to the contacts of said switch adjustably mounted on said assembly, a member reciprocally mounted for movement toward and away from said assembly, means carried by the member for engaging the elements in sequence upon rotation of said assembly, means for reciprocating said member toward said assembly to engage its means with said elements, and means responsive to such engagement for actuating the rotation imparting means, the adjustment of said elements determining the intervals between actuations of said rotation imparting means.

2. An automatic time control as set forth in claim 1 including means for reciprocating the member away from the magazine assembly upon actuation of the rotation imparting means by the responsive means.

3. An automatic time control as set forth in claim 1 including means for urging the member away from the magazine assembly, and clutch means connecting the reciprocating means and member and releaseable upon actuation of the rotation imparting means by the responsive means to permit movement of said member away from said assembly.

4. An automatic time control as set forth in claim 1 wherein the magazine assembly includes a rotatable turret, the adjustable elements being slidably supported by the turret for relative projection and retraction, and means having connection with each element for adjusting its position independently of the other elements.

5. An automatic time control as set forth in claim 1 wherein the means for imparting intermittent rotation to the supporting means includes a solenoid, the responsive means including a switch for controlling the supply of electrical current to the solenoid.

6. An automatic time control as set forth in claim 5 including a pawl and sprocket drive connection between the solenoid and supporting means.

7. An automatic time control as set forth in claim 5 wherein the magazine assembly includes a rotatable turret supporting the adjustable elements for projection and retraction relative thereto, and means having connection with each element for adjusting its position independently of the other elements.

8. An automatic time control as set forth in claim 5 including means for urging the member away from the magazine assembly, clutch means connecting the reciprocating means and member, and means releasing the clutch means upon actuation of the solenoid to permit movement of said member away from said assembly.

9. An automatic time control as set forth in claim 8 wherein the magazine assembly includes a rotatable turret supporting the adjustable elements for projection and retraction relative thereto, and means having connection with each element for adjusting its position independently of the other elements.

10. An automatic time control for successively supplying electrical current to a plurality of electrically operated mechanisms including a selector switch for controlling the flow of current to the mechanisms, a magazine assembly having a plurality of elements corresponding to the contacts of the selector switch, a shaft supporting the magazine assembly and switch for rotation in unison, a member mounted for movement toward and away from said assembly, an element carried by the member for movement therewith into and out of engagement with the magazine elements in sequence upon rotation of said assembly, drive means for moving said member toward said assembly to engage its element with said magazine elements, and means actuated by the engagement of the elements for imparting intermittent rotation to the shaft to advance said selector switch and magazine assembly step by step, said magazine elements being adjustable to vary the positions thereof relative to said assembly and the element of the movable member and the intervals between actuations of the rotation imparting means.

11. An automatic time control as set forth in claim 10 wherein the means for imparting rotation to the shaft includes a solenoid and a switch actuated by engagement of the elements for energizing the solenoid.

12. An automatic time control as set forth in claim 10 including a pawl and sprocket connection between the shaft and the means for imparting rotation thereto.

13. An automatic time control as set forth in claim 10 including means having connection with each element of the magazine assembly for adjusting its position independently of the other elements thereof.

14. An automatic time control as set forth in claim 10 wherein the magazine assembly includes a rotatable turret, the magazine elements being slidably supported by the turret for projection and retraction relative to the element of the movable member, and means having connection with each magazine element for adjusting the position thereof independently of the other magazine elements.

15. An automatic time control as set forth in claim 10 including means for urging the movable member away from the magazine assembly, clutch means connecting the drive means and member, and means momentarily releasing the clutch means upon actuation of the rotation imparting means to permit movement of said member away from said assembly.

16. An automatic time control as set forth in claim 15 wherein the means for imparting rotation to the shaft includes a solenoid and a switch actuated by engagement of the elements for energizing the solenoid.

17. An automatic time control as set forth in claim 15 including a pawl and sprocket connection between the shaft and the means for imparting rotation thereto.

18. An automatic time control as set forth in claim 15 including means having connection with each element of the magazine assembly for adjusting its position independently of the other elements thereof.

19. An automatic time control as set forth in claim 15 wherein the magazine assembly includes a rotatable turret, the magazine elements being slidably supported by the turret for projection and retraction relative to the element of the movable member, and means having connection with each magazine element for adjusting the position thereof independently of the other magazine elements.

20. An automatic time control as set forth in claim 10 including means for urging the movable member away from the magazine assembly, the drive means including a longitudinally movable support, a pair of gears journaled on the support, clutch means for connecting the gears, means urging said support longitudinally in one direction for engaging the clutch means, and means actuated by the rotation imparting means for moving said support in the opposite direction to disengage said clutch means and permit movement of said member away from said assembly.

21. An automatic time control as set forth in claim 1 wherein the magazine assembly includes a cylindrical rotatable turret, the adjustable elements including plungers slidably mounted in the peripheral portion of the turret for movement axially thereof, and a knob concentrically surrounding a portion of each plunger and having screwthreaded connection therewith for reciprocating the plunger by relative rotation.

22. An automatic time control as set forth in claim 10 wherein the magazine assembly includes a cylindrical rotatable turret, each magazine element being slidably mounted in the peripheral portion of the turret for movement axially thereof, and a knob concentrically surrounding a portion of each element and having screwthreaded connection therewith for reciprocating the element by relative rotation.

References Cited in the file of this patent

UNITED STATES PATENTS

| | | |
|---|---|---|
| 2,852,727 | Barnett | Sept. 16, 1958 |
| 2,901,615 | Devendorf | Aug. 25, 1959 |
| 2,988,932 | Swanson | June 20, 1961 |